United States Patent [19]

Major

[11] Patent Number: 4,464,592
[45] Date of Patent: Aug. 7, 1984

[54] PRIME MOVER

[76] Inventor: Emery Major, 1210 Brickyard Cove Rd., Point Richmond, Calif. 94801

[21] Appl. No.: 398,087

[22] Filed: Jul. 14, 1982

[51] Int. Cl.³ .............................................. H02K 9/00
[52] U.S. Cl. ........................................ 310/54; 310/57; 310/64; 310/86; 310/156; 310/194; 310/112
[58] Field of Search ........................ 310/54, 57, 63, 64, 310/86, 156, 194, 268, 112

[56] References Cited

U.S. PATENT DOCUMENTS

| | | | |
|---|---|---|---|
| 2,691,124 | 10/1954 | Aske | 310/268 |
| 2,951,954 | 9/1960 | Willyoung | 310/57 |
| 4,211,945 | 7/1980 | Tawse | 310/156 |
| 4,295,067 | 10/1981 | Binder et al. | 310/64 |
| 4,334,160 | 6/1982 | McCarty | 310/268 |
| 4,369,384 | 1/1983 | Nardi | 310/268 |

*Primary Examiner*—Donovan F. Duggan
*Assistant Examiner*—Anita M. Ault
*Attorney, Agent, or Firm*—Thomas R. Lampe

[57] ABSTRACT

An electromagnetic prime mover device comprising a rotor in the form of a flywheel and a stator including a fluid-tight housing accommodating coolant.

6 Claims, 10 Drawing Figures

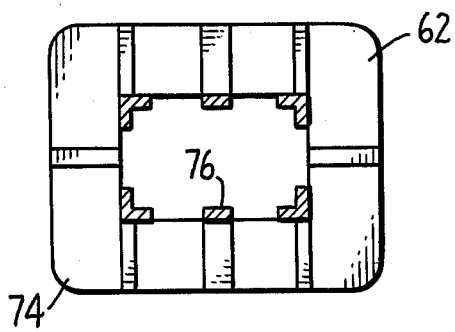
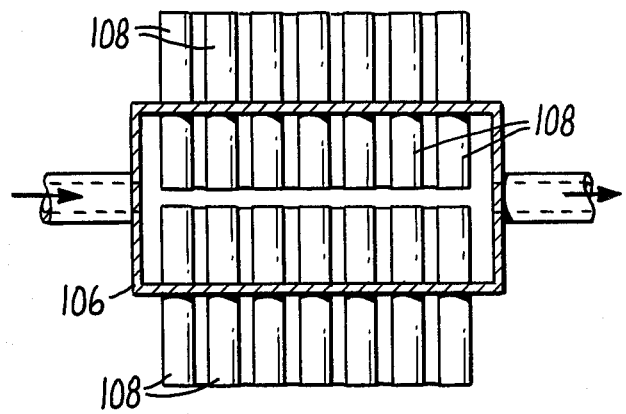
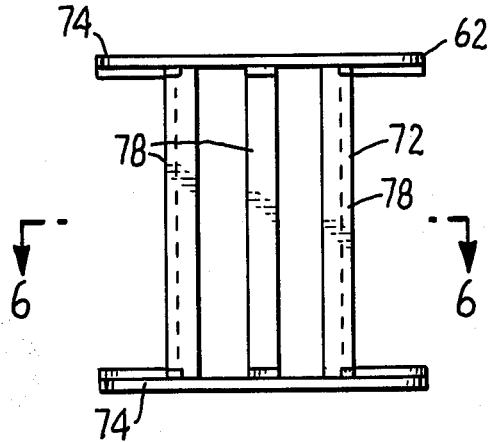
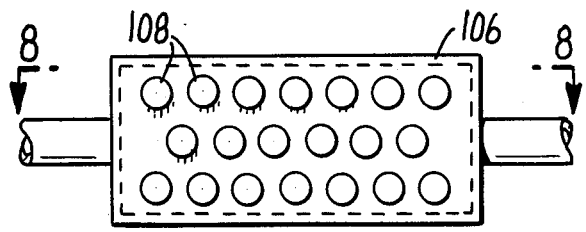
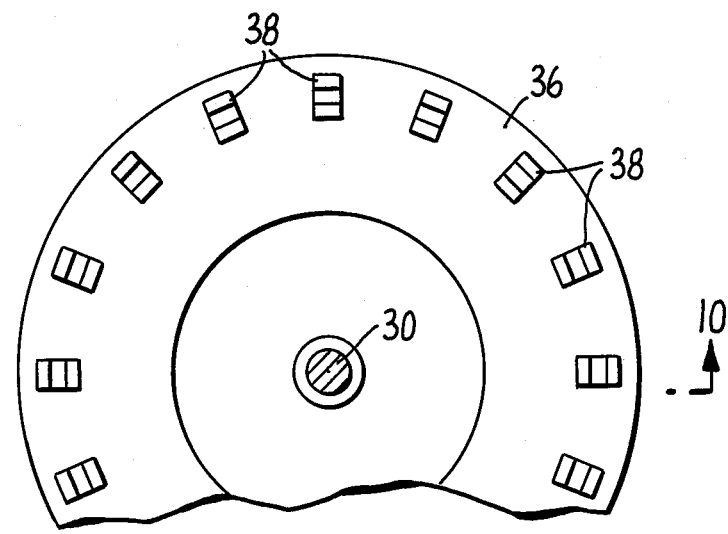
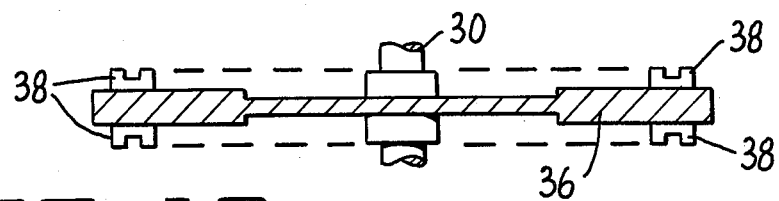

PRIME MOVER

FIELD OF THE INVENTION

The present invention relates generally to a prime mover and in particular an electromagnetic motor construction incorporating permanent magnets in the rotor thereof.

BACKGROUND OF THE INVENTION

A wide variety of electromagnetic motor constructions are known in the art, as exemplified by those shown in U.S. Pat. No. 3,292,023 issued Dec. 13, 1966 to Kober, U.S. Pat. No. 4,025,807 issued May 24, 1977 to Clover, U.S. Pat. No. 4,020,372 issued Apr. 26, 1977 to Whiteley, U.S. Pat. No. 3,992,642 issued Nov. 16, 1976 to Heinrich et al., U.S. Pat. No. 3,983,430 issued Sept. 28, 1976 to Howard, U.S. Pat. No. 4,037,124 issued July 19, 1977 to Kullmann et al., U.S. Pat. No. 3,845,339 issued Oct. 29, 1974 to Merkle et al., U.S. Pat. No. 3,428,840 issued Feb. 18, 1969 to Kober, U.S. Pat. No. 3,445,691 issued May 20, 1969 to Beyersdorf et al., U.S. Pat. No. 3,277,323 issued Oct. 4, 1966 to Parker, U.S. Pat. No. 2,782,721 issued Feb. 26, 1957 to White, and U.S. Pat. No. 3,223,043 issued Dec. 14, 1965 to Shapiro.

Prior art motors are characterized by their relative complexity and by undesirable variations in speed caused by electric motor impulses when the motors are scaled up in size. In addition, cooling has been a problem, often requiring expensive cooling systems used in conjunction with the motor to attain adequate heat dissipation and removal. Because of their bulk, many of the prior art devices do not readily lend themselves to being utilized on a common drive shaft with other prime mover mechanisms of like construction.

BRIEF SUMMARY OF THE INVENTION

The motor of the present invention is characterized by its simplicity of construction and incorporates several features not found in the prior art yet deemed to be desirable. In particular, the motor constructed in accordance with the teachings of the present invention includes a flywheel rotor construction which functions to dampen impulses applied to the motor by electromagnets operatively associated therewith, thus contributing to the smooth operation of the motor. In addition, the stator of the motor which houses the aforesaid electromagnets, is particularly adapted to be cooled by liquid coolant circulated therethrough. Preferably auxilliary cooling means including heat pipes are also provided as part of the simple and inexpensive system, providing cooling of the motor elements. The motor of the present invention is also configured to provide ease of stacking with motors of like construction so that several motors can be operatively associated with a common drive shaft.

BRIEF DESCRIPTION OF THE DRAWINGS

Other desirable characteristics of the present invention will be readily apparent with reference to the following more detailed description and accompanying drawings which:

FIG. 5 is a side view of a bobbin element incorporated in the electromagnet construction;

FIG. 6 is a cross sectional view taken along line 6—6 of FIG. 5;

FIG. 7 is a plan view of a heat dissipation device suitably employed in operative association with the motor;

FIG. 8 is a cross sectional view taken along line 8—8 of FIG. 7;

FIG. 9 is a partial plan view of the rotor component of the motor; and

FIG. 10 is a cross sectional view taken along line 10—10 in FIG. 9.

DETAILED DESCRIPTION

Figure 1:
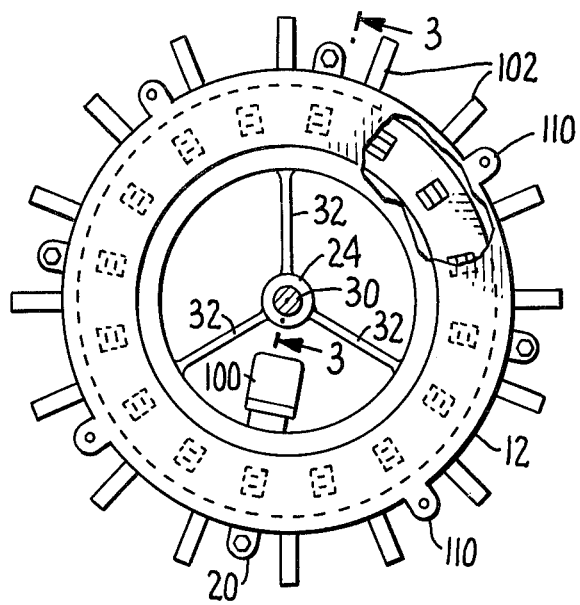
FIG. 1 is a plan view of a motor constructed in accordance with the teachings of the present invention with a portion thereof broken away.
Figure 2:
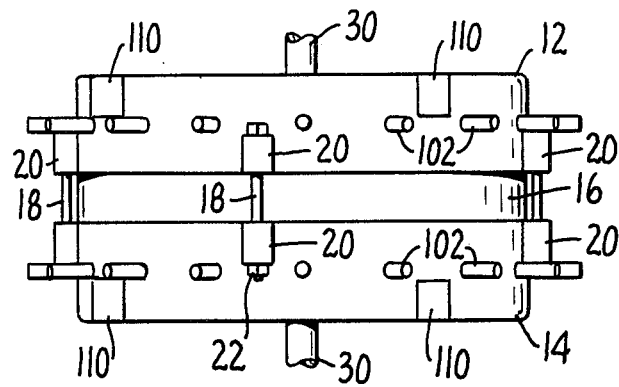
FIG. 2 is a side view of the motor.

Referring to the drawings, an electromagnetic motor constructed in accordance with the teachings of the present invention includes two stator housings 12 and 14 within which are housed the other elements of the two stators of the motor as will be described in detail below. The generally donut-shaped housings 12 and 13 are secured to a spacer ring 16 by a plurality of bolts 18 projecting through apertures formed in projections 20 radially disposed about the peripheries of the housings. Nuts 22 threadedly engaged with bolts 18 maintain the housings and spacer ring in a structurally rigid relationship. The housings and spacer ring may be formed of any suitable material such as cast aluminum.

Each of the stator housings is connected to a centrally disposed boss 24 defining a throughbore within which is disposed the shaft 30 of the motor rotor. Shaft 30 is rotatably centrally disposed within each boss by a radial bearing element 25. A dust seal 26 of elastomer or the like is positioned between each bearing element 25 and a retainer ring 28. Preferably, for the purpose of holding down the weight of the motor, bosses 24 are connected to the donut-shaped housings 12 and 14 by a plurality of radially projecting ribs 32.

Shaft 30 is attached to a rotor in the form of a flywheel 36 constructed of a nonmagnetic, high stress alloy such as stainless steel having a plurality of permanent magnets 38 affixed thereto in a circular row. Flywheel 36 is of generally planar 2-sided construction rotatable with shaft 30 about the central axis of the shaft. Permanent magnets 38, which are of generally horseshoe-shaped configuration, project from both sides of the flywheel as may best be seen with reference to FIG. 10.

The circular configuration of permanent magnets 38 of the rotor is congruent with the circular configuration of electromagnets 58 disposed within channels 40 formed by housings 12 and 14. This relationship may best be seen with reference to FIG. 3. Circular plates 42 constructed of aluminum or other suitable nonmagnetic material provide a fluid-tight seal with the housings so that pressurized fluid may be circulated within the channels in a manner to be described below. Mounted within channels 40 by any suitable expedient such as bolts, screws, etc. are the aforementioned electromagnets 58. As stated above, said electromagnets are disposed in a circular row congruent to the circular row of rotor permanent magnets 38 whereby the stator electromagnets will be in selective registry with the rotor permanent magnets upon rotation of the rotor. Referring now specifically to FIGS. 3, 4, 5 and 6, each electromagnet 58 includes a generally horseshoe-shaped iron core 60 of laminated or unitary construction, bobbins 62 and 64 positioned over the arms of the core 60, and coils 66 and 68 wrapped around the bobbins and arms in the manner illustrated. The central portions of the cores are secured to raised boss members 70 formed in the housings 12 and 14.

A representative bobbin 62 is illustrated in FIGS. 5 and 6. Bobbin 62 is of unitary construction and is formed of nylon or other suitable nonconducting, nonmagnetic material. The bobbin includes a central bobbin element 72 connected to two enlarged bobbin end elements 74. A throughbore 76 for accomodating a core arm is defined by the bobbin and the central bobbin element is essentially formed by a plurality of columns 78 to provide fluid coolant passageways therebetween and between the bobbin exterior and throughbore 76.

Figure 4:
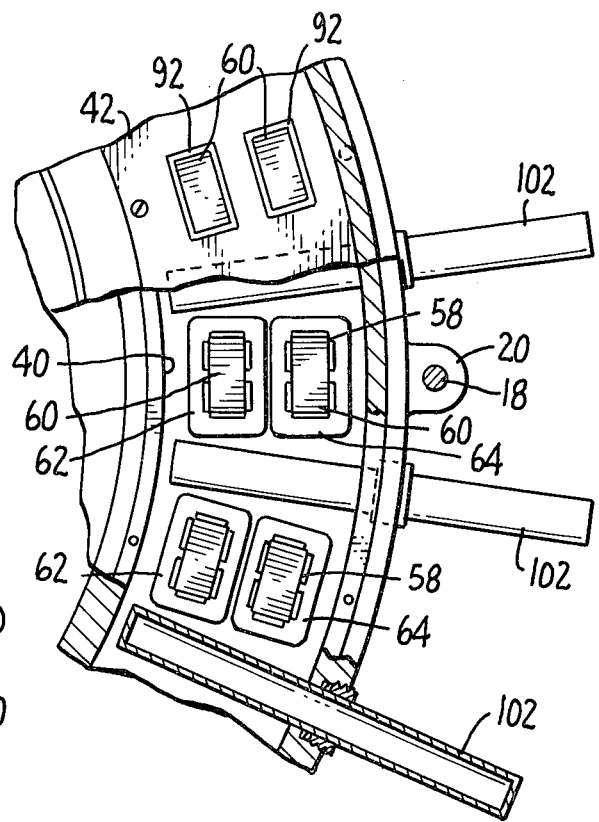
FIG. 4 is a sectional enlarged plan view showing details of the stator and electromagnets operatively associated therewith.
Figure 3:
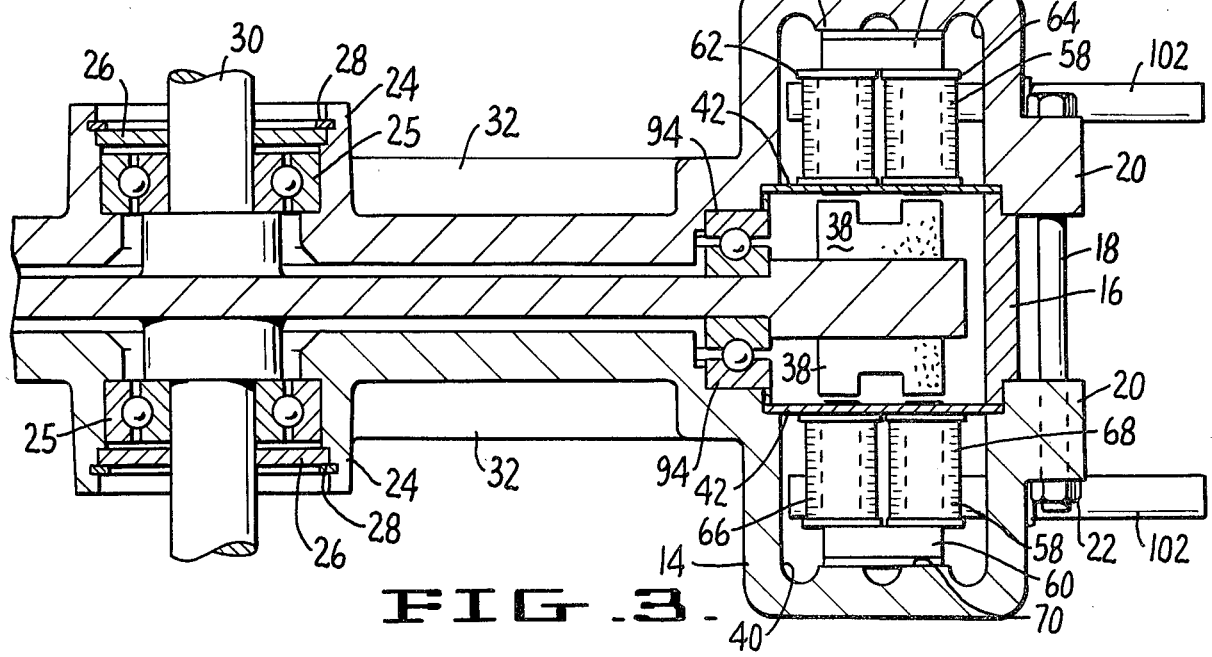
FIG. 3 is an enlarged cross sectional view taken along the line 3—3 of FIG. 1.

The upwardly projecting ends of the electromagnet core arms are in registry with and pass through apertures formed in circular plates 42 as may perhaps best be seen with reference to FIG. 4. The plates 42 are preferably quite thin, e.g. in the order of ten ten thousandths of an inch or less and seals 92 of elastomer or the like provide a fluid-tight seal between the plates and their associated core arms. The permanent magnets 38 of the rotor are maintained in precise spaced relationship with the electromagnet core ends by means of bearings 94 positioned between the rotor flywheel and the housings. It will be appreciated that rotation of the rotor will be accomplished in conventional fashion by successively activating and deactivatig the electromagnets 58. The precise mechanism for accomplishing this forms no part of the present invention and will not be described further except to state that any DC flip flop control of the type well known in the prior art may be utilized to activate the motor.

An important aspect of the present invention resides in the cooling system utilized to attain adequate heat dissipation and removal. According to the present invention a suitable coolant such as oil is continually circulated in channels 40 which are of course sealed off from the rotor portion. Such circulation may be accomplished by any suitable fluid circulation pump 100. Heat pipes 102 are disposed about the periphery of the motor and project into the channels with a significant portion of the heat pipes projecting outwardly from housings 12 and 14. Any suitable means may be utilized to secure the heat pipes into position such as the illustrated locking ring and seal arrangement. The heat pipes comprise closed ended cylinders defining an interior filled with a suitable solvent or liquid such as water. This cooling action may be supplemented by directing the coolant from the interior of the channels through a heat dissipating device outside the motor per se and redirecting the coolant back into the motor housings. FIGS. 7 and 8 illustrate one such arrangement wherein the coolant is passed through a heat exchange body 106 having a plurality of heat pipes 108 operatively associated therewith. The heat pipes may be of any suitable conventional construction.

The flywheel nature of the rotor of the present invention contributes to the smooth operation of the motor by dampening impulses applied to the rotor by the electromagnets. Such construction has another advantage in that its essentially flat configuration allows the motor itself to be flat, thus permitting it to be stacked with rotors of like construction so that several may be operatively associated with a common drive shaft. To facilitate this, shaft 30 may be splined along its length. Each of the stators includes apertured lip elements 110 which are adapted to accomodate elongated rods or bolts (not shown) to secure a plurality of motors together.

I claim:
1. Apparatus comprising, in combination:
a rotor including a circular flywheel of generally planar two-sided configuration rotatable about a central axis and a plurality of permanent magnets affixed to said flywheel, said magnets spaced from said axis and closely adjacent to the outer periphery of said flywheel and projecting from both planar sides of said flywheel substantially parallel to the direction of said axis, and
two stators coaxially positioned adjacent to said flywheel on opposite planar sides thereof and including a plurality of electromagnets positioned in selective registry with said rotor permanent magnets whereby periodic energization of said electromagnets will repel said permanent magnets and cause rotation of said rotor, each said stator additionally including a fluid-tight donut-shaped housing forming a channel accomodating said electromagnets and fluid coolant and a circular plate fixedly disposed over said channel in fluid-tight fashion to keep said fluid coolant away from said rotor; and
means for securing said stators in spaced relationship to said rotor, said securing means including a spacer ring positioned between the stators about the periphery of said rotor and means for attaching said stators to said spacing ring.

2. The apparatus of claim 1 including heat removing means in the form of a plurality of heat pipes radiating outwardly from said housing and projecting into the interior thereof.

3. The apparatus of claim 1 additionally including means for securing said apparatus coaxially with apparatus of like construction.

4. The apparatus of claim 1 wherein said plate has apertures therein through which portions of said electromagnets project and fluid-tight seal means between said electromagnet portions and plate.

5. The apparatus of claim 1 wherein said electromagnets each comprises a bobbin, a core member positioned in said bobbin, and coil means disposed about the periphery of said bobbin and core member and wherein said bobbin defines apertures to permit the passage of coolant therethrough.

6. The apparatus of claim 1 wherein bearing means is disposed between the flywheel near the outer periphery thereof and the stator to maintain a predetermined distance between the permanent magnets and the electromagnets.

* * * * *